(No Model.)

T. RHOADS.
CAR BRAKE AND STARTER.

No. 391,818. Patented Oct. 30, 1888.

Witnesses.

Inventor.
Thomas Rhoads.
By his Attorneys

UNITED STATES PATENT OFFICE.

THOMAS RHOADS, OF CASTLE DALE, UTAH TERRITORY.

CAR BRAKE AND STARTER.

SPECIFICATION forming part of Letters Patent No. 391,818, dated October 30, 1888.

Application filed May 3, 1888. Serial No. 272,710. (No model.)

*To all whom it may concern:*

Be it known that I, THOMAS RHOADS, a citizen of the United States, residing at Castle Dale, in the county of Emery and Territory of Utah, have invented a new and useful Improvement in Car Brakes and Starters, of which the following is a specification.

My invention relates to an improvement in car brakes and starters; and it consists in the peculiar construction and combination of devices, that will be more fully set forth hereinafter, and particularly pointed out in the claims.

Figure 1:
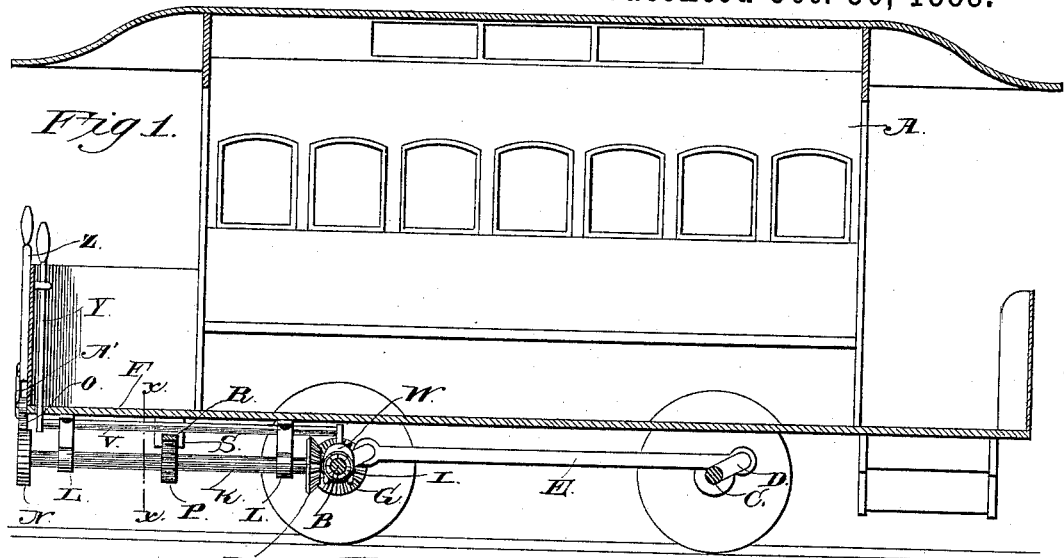
Figure 2:
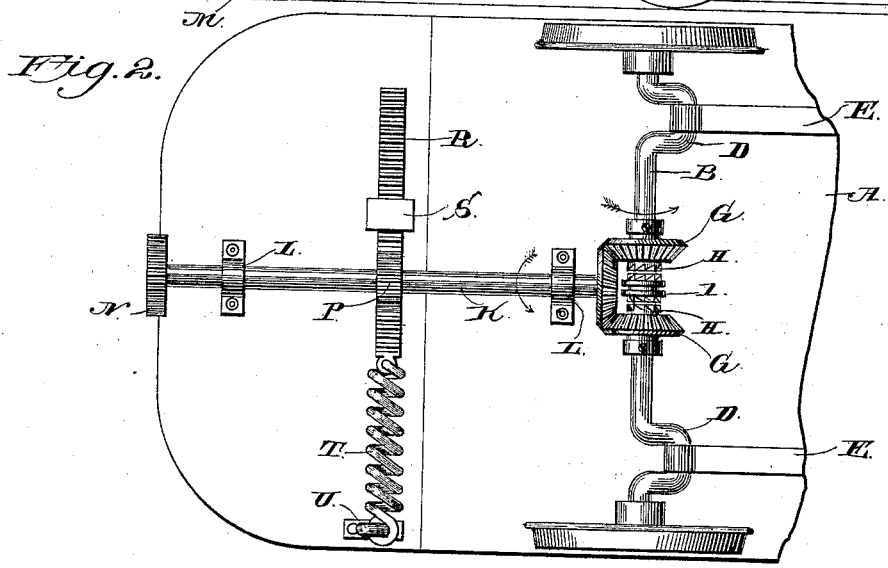
Figure 3:
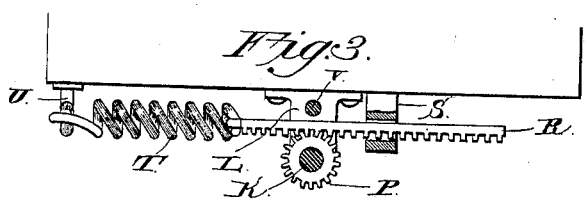

In the accompanying drawings, Figure 1 is a vertical sectional view of a street-railway car provided with a brake and starter embodying my improvements. Fig. 2 is a bottom plan view of the same. Fig. 3 is a vertical transverse sectional view taken on the line $x$ $x$ of Fig. 1.

A represents a street-car of the usual construction.

B C represent the axles thereof, which are provided with the cranks D, connected by means of parallel rods E. At the front end of the car is the usual platform, F, for the driver. Loosely secured on the front axle, B, is a pair of miter gear-wheels, G, which face each other, and said gear-wheels are provided on their opposing sides with clutch-sections H.

I represents a clutch, which is feathered or splined on the front axle between the wheels G, and is adapted to be moved in either direction, so as to engage either of the said wheels and lock the same rigidly to the front axle, while permitting the opposite wheel, G, to turn loosely thereon.

K represents a longitudinal shaft, which is arranged under the bottom of the car, and is journaled in suitable hangers, L, that depend therefrom. To the rear end of the shaft is rigidly secured a miter-wheel, M, which engages the wheels G, and to the front end of the said shaft is rigidly secured a ratchet-wheel, N, which is engaged by a gravity-pawl, O, the function of the latter being to prevent retrograde rotation of the shaft while the pawl is in engagement with the said ratchet-wheel.

P represents a spur-wheel, which is rigidly secured to the shaft K and is engaged by a rack-bar, R, which is arranged transversely under the bottom of the car and is guided in suitable guides or keepers, S. To one end of the said rack-bar is secured one end of a coiled retractile spring, T, the opposite end of which is secured to a bolt or bracket, U, that depends from the bottom of the car, or to any other suitable fixed point.

V represents a rock-shaft, which is journaled in the hangers L above the shaft K, and has a yoke or arm, W, at its rear end, the lower bifurcated end of which engages an annular peripheral groove in the clutch I, so as to move the said clutch in either direction on the said axle when the rock-shaft is turned, and to the front end of the rock-shaft is secured a handle-lever, Y, which extends upward through a slot or opening in the bottom of the platform and is within convenient reach of the driver.

Z represents a bell-crank lever, which is fulcrumed on the front side of the platform, is provided at its upper end with a suitable handle, whereby it may be readily grasped by the driver, and has its lower shorter end connected to the pawl or detent O by means of a link, A'.

The operation of my invention is as follows: When the car is in motion, the clutch is moved out of engagement with the wheels G, so that said wheels and the shaft K remain stationary, the front axle of the car turning loosely in the wheels G. When it is desired to stop the car, the driver moves the lever Y, so as to cause the clutch H to engage one of the wheels G, according to the direction in which the car is moving, and thereby lock the said wheel to the said axle, and the inertia of the car thereby causes the rotary motion of the front axle to be communicated to the shaft K and the pinion P to move the rack-bar R longitudinally, so as to distend the spring P, thereby accumulating the energy in the said spring, and consequently acting as a brake to stop the car. While the shaft K is turning, as before described, the pawl or detent O slips idly on the ratchet-wheel N, and when the said shaft K is at rest the said pawl or detent prevents retrograde rotation thereof. In order to start the car, the driver operates the lever Z so as to release the pawl or detent from the ratchet-wheel, and the spring, in contracting, moves the rack-bar R to its initial position, and while doing so it turns the shaft K in the direction opposite that indicated by the arrow in Fig. 2, and consequently causes the wheel M and the wheel G, which is locked to the front axle of the car, to rotate the said front axle and materially assist the horses in starting the car.

By reason of the cranks with which the car-axles are provided and the parallel rods which connect the said cranks the axles are caused to rotate in unison, and thereby prevent the front wheels from slipping on the track when the rotation thereof is opposed by the tension of the spring P.

Having thus described my invention, I claim—

1. The combination, in a car brake and starter, of the front axle, the wheels G, loose thereon, the clutch to engage either of said wheels and lock the same to the axle, the shaft K, having the wheel M, engaging wheels G, and the ratchet-wheel N, the pawl or detent to engage and lock the ratchet-wheel, the spring T, and connections between the same and the shaft K, for the purpose set forth, substantially as described.

2. The combination, in a car brake and starter, of the axle, the wheels G, loose thereon, the clutch engaging either of the said wheels to lock the same to the axle, the shaft K, having the wheel M, engaging the wheels G, the wheel P, secured to said shaft, the rack-bar R, engaging said wheel, and the spring to move the rack-bar longitudinally in one direction, for the purpose set forth, substantially as described.

3. The combination, in a car brake and starter, of the axles having the cranks, the parallel rods connecting the same, the wheels G, loose on one of the axles, the clutch to engage either of said wheels and lock the same to the axle, the shaft K, having the wheel M, engaging the wheels G, and the spring connected to the said shaft, for the purpose set forth, substantially as described.

In testimony that I claim the foregoing as my own I have hereto affixed my signature in presence of two witnesses.

THOMAS RHOADS.

Witnesses:
J. H. SIGGERS,
E. G. SIGGERS.